(No Model.)

F. S. & C. E. MEYERS.
FARM GATE.

No. 497,384. Patented May 16, 1893.

Witnesses
C. A. Ford.
N. W. Riley

Inventors
Frederick S. Meyers,
& Charles E. Meyers,
By their Attorneys,
C. A. Snow & Co.

UNITED STATES PATENT OFFICE.

FREDERICK S. MEYERS AND CHARLES E. MEYERS, OF FALLS CITY, NEBRASKA.

FARM-GATE.

SPECIFICATION forming part of Letters Patent No. 497,384, dated May 16, 1893.

Application filed September 14, 1891. Serial No. 405,716. (No model.)

*To all whom it may concern:*

Be it known that we, FREDERICK S. MEYERS and CHARLES E. MEYERS, of Falls City, in the county of Richardson and State of Nebraska, have invented certain useful Improvements in Farm-Gates; and we do hereby declare that the following is a full, clear, and exact description of the invention, such as will enable others skilled in the art to which it appertains to make and use the same, reference being had to the accompanying drawings, which form a part of this specification.

The invention relates to improvements in gates.

The object of the present invention is to improve the construction of rates, and to provide one which may be lifted vertically to permit the passage of small animals, and which may be readily adjusted to prevent sagging.

The invention consists in the construction and novel combination and arrangement of parts hereinafter fully described, illustrated in the accompanying drawings and pointed out in the claims hereto appended.

Figure 1:
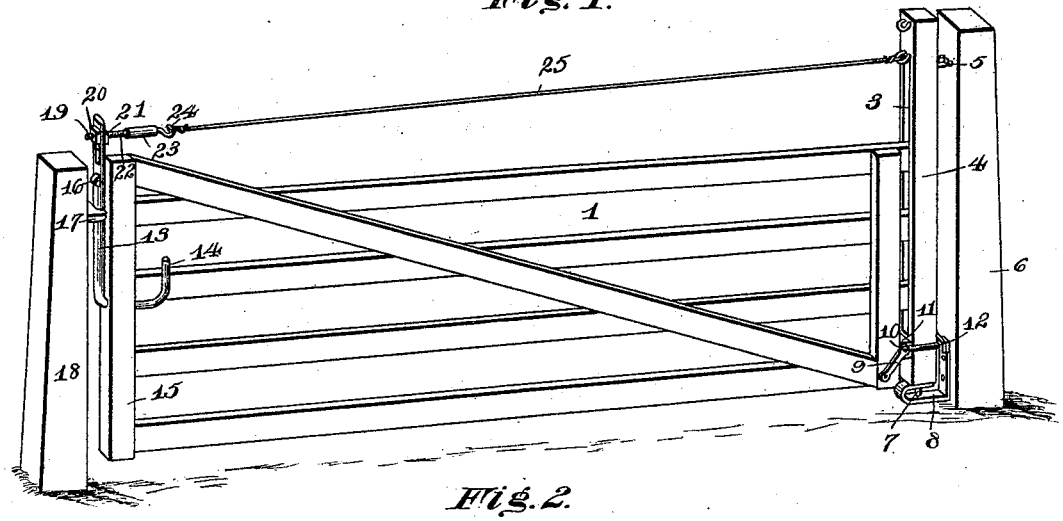
Figure 2:
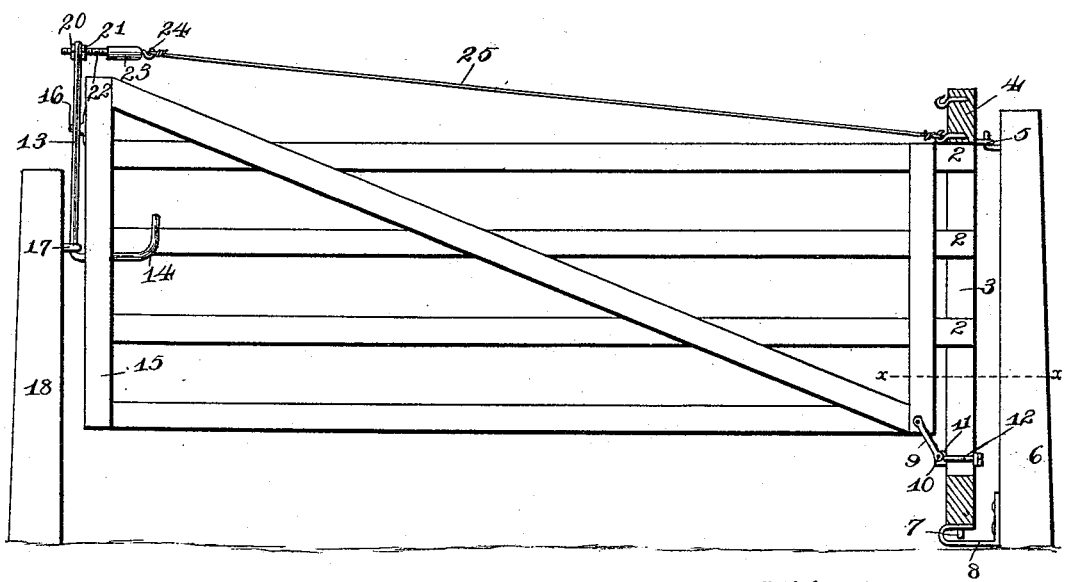
Figures 3, 4:
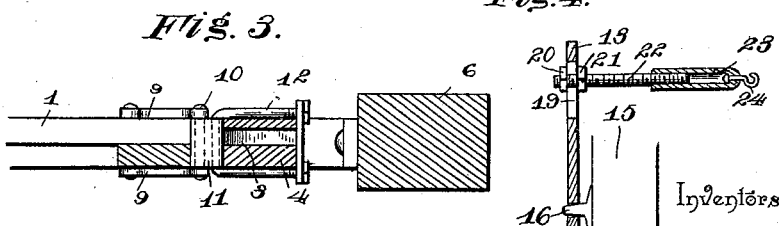

In the drawings—Figure 1 is a perspective view of a gate constructed in accordance with this invention. Fig. 2 is an elevation of the same partly in section, the gate being shown elevated. Fig. 3 is a detail horizontal sectional view. Fig. 4 is a detail vertical sectional view of the upper portion of the latch.

Like numerals of reference indicate corresponding parts in all the figures of the drawings.

1 designates a gate, having the rear ends 2 of its horizontal rails extended to form projections and arranged in a vertical opening or slot 3 of a hinged bar 4. The bar 4 is connected near its upper end by a hinge 5 with a hinge post 6, and its lower end is provided with a depending pivot 7, which is journaled or stepped in bearings of a bracket 8 secured to the hinge post at the bottom thereof. The bracket 8 is approximately L-shaped and has the outer portion of its horizontal arm extended inward and provided with an opening or perforation to receive the pivot 7. The lower rear end of the gate is connected with the hinged bar 4 by parallel links 9, which permit the gate to have a limited vertical movement to be elevated as illustrated in Fig. 2 of the accompanying drawings to afford a passage for small animals, and to be lowered as shown in Fig. 1. The links have their forward ends pivoted at opposite sides of the gate, and their rear ends are secured by a pivot 10 to a coupling block 11, which has two transverse perforations one to receive the said pivot 10, and the other to receive a clip 12 for adjustably securing the coupling block to the hinged bar 4. The clip 12 enables the coupling block to be adjusted vertically to shift the position of the gate. The front end of the gate has disposed vertically on it the stem 13 of a J-shaped latch, which has its hook portion 14 arranged in a perforation of the front end bar 15 of the gate, and which is mounted on a fulcrum 16, whereby the lower portion is forced outward for engaging a keeper 17 of a latch post 18. The stem of the latch is provided intermediate of its ends with an opening to receive the fulcrum; and its upper portion has a longitudinal slot 19 in which is adjustably secured by nuts 20 and 21 a screw 22. The screw 22 is connected with a swivel 23, which is interiorly threaded to receive the screw, and which has its hook 24 attached to a wire 25 extending along the top of the gate and secured to the hinged bar 4 near the upper end thereof. By adjusting the screw vertically in the longitudinal slot of the stem of the latch, the leverage of the latter may be varied; the swivel enables the tension of the wire 25 to be adjusted; and the weight of the gate operates on the latch to throw the lower portion outward for engaging the keeper, thereby obviating the necessity of employing springs or weights to effect this result. This construction also enables the front end of the gate to be maintained above the ground to counteract any sagging.

It will be seen that the gate is simple and comparatively inexpensive in construction, that it may be adjusted to prevent sagging and move vertically to provide a passage way beneath it for small animals, and that the tension of the latch may be readily adjusted.

Changes in the form, proportion and the minor details of construction may be resorted to without departing from the principle or sacrificing any of the advantages of this invention.

What we claim is—

1. The combination with a latch post having a keeper and a hinge post, of a bar hinged to the hinge post and provided with a vertical groove or opening, a gate having its inner end arranged in the groove or opening, a coupling block, a clamp adjustably securing the coupling block to the hinged bar, the links hingedly connected to the gate and to the block, and a vertically disposed latch fulcrumed on the gate and having its upper end connected with the hinged bar and having its lower end arranged to engage the keeper, substantially as described.

2. The combination with a latch post having a keeper and a hinge post, of a bar hinged to the latter, a gate having its inner end slidingly mounted on and capable of a limited vertical movement on the hinged bar, and a J-shaped latch fulcrumed on the front end of the gate and having its upper end adjustably connected with the hinged bar and its lower curved end arranged to engage the gate to form a stop, substantially as described.

3. The combination with a latch post having a keeper and a hinge post, of a bar hinged to the latter, a gate slidingly mounted on the hinged bar, a J-shaped latch fulcrumed on the gate and provided at its upper end with a longitudinal slot and having its lower curved end arranged to engage the gate, a horizontal screw arranged in said slot and provided with clamping nuts located on opposite sides of the latch, and an interiorly threaded swivel receiving the screw and connected with the hinged bar, substantially as described.

In testimony whereof we affix our signatures in presence of two witnesses.

FREDERICK S. MEYERS.
CHARLES E. MEYERS.

Witnesses:
J. W. STUMP,
B. F. WISER.